US010647948B2

(12) United States Patent
Sherry et al.

(10) Patent No.: US 10,647,948 B2
(45) Date of Patent: May 12, 2020

(54) POLYMER CONTAINING ANTIMICROBIAL HARD SURFACE CLEANING COMPOSITIONS

(71) Applicant: The Procter & Gamble Company, Cincinnati, OH (US)

(72) Inventors: Alan Edward Sherry, Newport, KY (US); Molly Pelon Bohlen, Montgomery, OH (US); Samuel Kimani Njoroge, Cincinnati, OH (US); LaShanda Marie Glenn, Maineville, OH (US); Janice Lynn Dhonau, Maineville, OH (US); Christopher Todd Morrissey, Mason, OH (US); Jamesina Anne Fitzgerald, Trenton, OH (US); Phillip Kyle Vinson, Fairfield, OH (US); Melinda Phyllis Steffey, Liberty Township, OH (US); Rafael Ortiz, Milford, OH (US); Benjamin Patrick Hale, West Chester, OH (US); Yonas Gizaw, West Chester, OH (US); Roy Jerome Harrington, Liberty Township, OH (US); Peter Herbert Koenig, Montgomery, OH (US); Nicola John Policicchio, Mason, OH (US); Stefano Scialla, Strombeek-Bever (BE); Steven Daryl Smith, Fairfield, OH (US); Matthew Scott Wagner, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 16/013,977

(22) Filed: Jun. 21, 2018

(65) Prior Publication Data

US 2018/0371377 A1 Dec. 27, 2018

Related U.S. Application Data

(60) Provisional application No. 62/522,822, filed on Jun. 21, 2017.

(30) Foreign Application Priority Data

Aug. 8, 2017 (EP) .................................... 17185278
Apr. 20, 2018 (EP) .................................... 18168439

(51) Int. Cl.
| | | |
|---|---|---|
| *C11D 3/48* | (2006.01) |
| *C11D 3/32* | (2006.01) |
| *C11D 3/39* | (2006.01) |
| *C11D 3/37* | (2006.01) |
| *C11D 1/75* | (2006.01) |
| *C11D 11/00* | (2006.01) |
| *C11D 1/835* | (2006.01) |
| *C11D 1/65* | (2006.01) |
| *C11D 1/86* | (2006.01) |
| *C11D 1/52* | (2006.01) |
| *A01N 37/18* | (2006.01) |
| *A01N 59/00* | (2006.01) |

(52) U.S. Cl.
CPC .................. *C11D 3/48* (2013.01); *C11D 1/65* (2013.01); *C11D 1/75* (2013.01); *C11D 1/835* (2013.01); *C11D 1/86* (2013.01); *C11D 3/32* (2013.01); *C11D 3/3707* (2013.01); *C11D 3/378* (2013.01); *C11D 3/3757* (2013.01); *C11D 3/3765* (2013.01); *C11D 3/3773* (2013.01); *C11D 3/3776* (2013.01); *C11D 3/3784* (2013.01); *C11D 3/3792* (2013.01); *C11D 3/3942* (2013.01); *C11D 11/0023* (2013.01); *A01N 37/18* (2013.01); *A01N 59/00* (2013.01); *C11D 1/521* (2013.01)

(58) Field of Classification Search
None
See application file for complete search history.

(56) References Cited

U.S. PATENT DOCUMENTS

| | | | |
|---|---|---|---|
| 6,013,615 | A | 1/2000 | Zhou et al. |
| 6,087,312 | A | 7/2000 | Masotti et al. |
| 6,136,776 | A | 10/2000 | Dickler et al. |
| 6,444,636 | B1 | 9/2002 | Toussaint et al. |
| 6,448,214 | B1 | 9/2002 | Del Duca et al. |
| 6,479,446 | B1 | 11/2002 | Sherry et al. |
| 6,537,955 | B1 | 3/2003 | Raso et al. |
| 6,642,197 | B1 | 11/2003 | Cheung et al. |
| 6,667,289 | B2 | 12/2003 | Harrison et al. |
| 6,699,825 | B2 | 3/2004 | Rees et al. |

(Continued)

FOREIGN PATENT DOCUMENTS

| | | |
|---|---|---|
| EP | 0691397 A2 | 1/1996 |
| EP | 3101105 A1 | 12/2016 |

(Continued)

OTHER PUBLICATIONS

U.S. Appl. No. 16/013,971, filed Jun. 21, 2018, Hayward, et al.

(Continued)

*Primary Examiner* — Katie L. Hammer

(74) *Attorney, Agent, or Firm* — John T. Dipre

(57) ABSTRACT

The need for a fast acting and broad spectrum antimicrobial composition which does not reduce surface shine and does not leave visible residues on the surface, while also providing greater residuality of the actives can be met by formulating antimicrobial compositions as described herein.

9 Claims, No Drawings

(56) References Cited

U.S. PATENT DOCUMENTS

| | | |
|---|---|---|
| 7,148,187 B1 | 12/2006 | Simon et al. |
| 8,648,027 B2 | 2/2014 | Mitchell et al. |
| 2003/0064910 A1 | 4/2003 | Fong et al. |
| 2003/0228991 A1 | 12/2003 | Johnson et al. |
| 2008/0251105 A1 | 10/2008 | Toussaint et al. |
| 2009/0117071 A1* | 5/2009 | Song .................. C08F 226/04 424/78.35 |
| 2011/0224170 A1 | 9/2011 | Wagner et al. |
| 2011/0311600 A1 | 12/2011 | Polzin et al. |
| 2012/0295831 A1* | 11/2012 | Masters .............. C11D 3/0094 510/432 |
| 2014/0020711 A1 | 1/2014 | Kaser |
| 2017/0172145 A1 | 6/2017 | Sherry et al. |
| 2018/0371374 A1 | 12/2018 | Hayward |
| 2018/0371376 A1 | 12/2018 | Hayward |

FOREIGN PATENT DOCUMENTS

| | | |
|---|---|---|
| GB | 2292562 A | 2/1996 |
| GB | 2318585 A | 4/1998 |
| GB | 2319179 A | 5/1998 |
| WO | WO9520024 A1 | 7/1995 |
| WO | WO9935227 A1 | 7/1999 |
| WO | WO0027981 A1 | 5/2000 |
| WO | WO2011075642 A1 | 6/2011 |
| WO | WO2013142474 A1 | 9/2013 |
| WO | WO2013162926 A1 | 10/2013 |
| WO | WO2014013234 A1 | 1/2014 |
| WO | WO2014163947 A1 | 10/2014 |

OTHER PUBLICATIONS

U.S. Appl. No. 16/013,974, filed Jun. 21, 2018, Hayward, et al.
Extended European Search report; Application No. 18168431.7-1110; dated May 18, 2018; 9 pages.
Extended European Search Report; Application No. 17177171.0-1358; dated Sep. 27, 2017; 7 pages.
Extended European Search Report; Application No. 17185278.3-1105; dated Mar. 8, 2018; 8 pages.
Extended European Search Report; Application No. 17185218.9-1105; dated Mar. 23, 2018; 8 pages.

* cited by examiner

POLYMER CONTAINING ANTIMICROBIAL HARD SURFACE CLEANING COMPOSITIONS

FIELD OF THE INVENTION

Fast acting, broad spectrum antimicrobial compositions comprising a polymer.

BACKGROUND OF THE INVENTION

Surfaces which are regularly contacted by organic matter, such as foodstuff, oils, sebum from skin contact, are often prone to contamination by microbes. Such surfaces are often treated or cleaned using antimicrobial compositions, in order to reduce or eliminate such microbes. To provide meaningful antimicrobial benefits, these antimicrobial compositions are ideally fast acting and ideally have broad spectrum activity. That is, efficacy over a broad range of microbes. In order to achieve fast acting, broad efficacy, antimicrobial compositions typically comprise high levels of antimicrobial actives. As such, they typically leave a residue which reduces surface shine and can give the impression that the surface has not been well cleaned. In addition, such compositions are often less suitable for use on surfaces that are in contact with food. In addition, greater residuality of the actives can provide longer lasting benefits.

Therefore, a need remains for a fast acting and broad spectrum antimicrobial composition which does not reduce surface shine and does not leave visible residues on the surface, while also providing greater residuality of the actives. WO 2013/162926 A1 relates to aqueous hard surface cleaner compositions which comprise 75 to 99 wt. % of water; 0.1 to 5 wt. % of a monoterpene; 0.1 to 5 wt. % of a C10-C17 fatty acid derivative; and 0.1 to 5 wt. % of one or more surfactants.

SUMMARY OF THE INVENTION

The present invention relates to an antimicrobial hard surface cleaning composition comprising: a detersive surfactant; an antimicrobial agent; an amide of formula I:

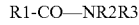

R1-CO—NR2R3  (I)

wherein R1 is selected from the group consisting of linear or branched, substituted or unsubstituted C6-C12, each of R2 and R3 is independently selected from H, OH, a halogen, or C1-C6 linear or branched, substituted or unsubstituted hydrocarbyl groups; a surface modification polymer, wherein the surface modification polymer is selected from the group consisting of: hydrophobically modified cationic polymer, oxazoline homopolymer, oxazoline, copolymer, vinylpyrrolidone homopolymer (PVP); polyethyleneglycol dimethylether (DM-PEG); a vinylpyrrolidone/dialkylamino-alkyl acrylate or methacrylate copolymers; a polystyrene-sulphonate polymer (PSS); a poly vinyl pyridine-N-oxide (PVNO); a polyvinylpyrrolidone/vinylimidazole copolymer (PVP-VI); a polyvinylpyrrolidone/polyacrylic acid copolymer (PVP-AA); a polyvinylpyrrolidone/vinylacetate copolymer (PVP-VA); a polyacrylic polymer or polyacrylicmaleic copolymer; and a polyacrylic or polyacrylic maleic phosphono end group copolymer; and mixtures thereof; water; and said composition has a pH from 1.0 to 6.0.

The present invention further relates to a method for cleaning a hard surface, comprising the steps of: optionally diluting the hard surface cleaning composition; applying the hard surface cleaning composition of the present invention to a hard surface; leaving the hard surface to dry without rinsing the surface.

DETAILED DESCRIPTION OF THE INVENTION

As defined herein, "essentially free of" a component means that no amount of that component is deliberately incorporated into the respective premix, or composition. Preferably, "essentially free of" a component means that no amount of that component is present in the respective premix, or composition.

As defined herein, "stable" means that no visible phase separation is observed for a premix kept at 25° C. for a period of at least two weeks, or at least four weeks, or greater than a month or greater than four months.

All percentages, ratios and proportions used herein are by weight percent of the composition, unless otherwise specified. All average values are calculated "by weight" of the composition, unless otherwise expressly indicated. All ratios are calculated as a weight/weight level, unless otherwise specified.

All measurements are performed at 25° C. unless otherwise specified.

Unless otherwise noted, all component or composition levels are in reference to the active portion of that component or composition, and are exclusive of impurities, for example, residual solvents or by-products, which may be present in commercially available sources of such components or compositions.

Antimicrobial Hard Surface Cleaning Compositions:

By "hard surface cleaning composition", it is meant herein a composition for cleaning hard surfaces found in households, especially domestic households. Surfaces to be cleaned include kitchens and bathrooms, e.g., floors, walls, tiles, windows, cupboards, sinks, showers, shower plastified curtains, wash basins, $WC_8$, fixtures and fittings and the like made of different materials like ceramic, vinyl, no-wax vinyl, linoleum, melamine, glass, steel, kitchen work surfaces, any plastics, plastified wood, metal or any painted or varnished or sealed surface and the like. Household hard surfaces also include household appliances including, but not limited to refrigerators, freezers, washing machines, automatic dryers, ovens, microwave ovens, dishwashers and so on. Such hard surfaces may be found both in private households as well as in commercial, institutional and industrial environments. The hard surface cleaning composition is preferably a liquid hard surface cleaning composition.

In a preferred embodiment, the liquid compositions herein are aqueous compositions, comprising at least 10% by weight of water. Therefore, they may comprise from 30% to 99.5% by weight of the total composition of water, preferably from 50% to 98% and more preferably from 80% to 97%.

The composition has a pH from 1.0 to 6.0, or from 1.0 to 5.5, or from 1.0 to 5.0, or from 2.5 to 5.0. The compositions disclosed herein may comprise an acidifying agent. The acidifying agent may be present to provide buffering capacity. The acidifying agent may also sequester transition metals, including iron, copper, manganese and the like. The acidifying agent may be chosen to further enhance the antimicrobial activity of the composition. The acidifying agent may be a US EPA/Health Canada registered active or a European notified antimicrobial substance.

Suitable acidifying agents may be selected from the group consisting of: organic acid, inorganic acid, and mixtures thereof. Suitable inorganic acids include phosphoric acid, sulphuric acid, urea-sulphuric acid, hydrochloric acid, sulphamic acid, methyl sulphuric acid, hypochlorous acid, sodium bisulphate (sodium hydrogen sulphate), and the like. Suitable organic acids include polymeric acids comprising at least 3 carboxylic acid groups, $C_1$-$C_{11}$ organic acids comprising at least one carboxylic acid group, and organic acids that do not comprise carboxylic acid functional groups (such as imidazole derivatives or phenolic or polyphenolic compounds). Non-limiting examples of polymeric acids include polymers of acrylic acid, methacrylic acid, maleic acid, or itaconic acid or copolymers of acrylic acid, methacrylic acid, maleic acid, itaconic acid, and mixtures thereof. Polymeric acids may be homopolymers or copolymers having a molecular weight of 500 g/mol or greater. The polymeric acid may have a molecular weight ranging from 500 g/mol to about 1,000,000 g/mol, or from 500 g/mol to 100,000 g/mol, or from about 1,000 g/mol to 20,000 g/mol. Copolymers may be random copolymers or block copolymers. In addition to monomer units comprising carboxylic acid groups, the copolymers may also include one or more other monomers, such as styrene, acrylic ester, acrylamide, olefin sulphonate, and olefin acetate.

Non-limiting examples of $C_1$-$C_{11}$ organic acids include formic acid, acetic acid, benzoic acid, malonic acid, citric acid, maleic acid, fumaric acid, succinic acid, lactic acid, malic acid, tartaric acid, gluconic acid, glutaric acid, adipic acid, 2-ethyl-1-hexanoic acid, heptanoic acid, octanoic acid, nonanoic acid, undecylenic acid, butane tetracarboxylic acid, and the like. The organic acid may be derived from a renewable, plant-based feedstock and produced using natural processes, such as fermentation; examples include bio-based acetic acid, bio-based citric acid, bio-based lactic acid and bio-based succinic acid, and the like. The organic acid may have food-use pedigree or be Generally Regarded As Safe (GRAS) or a food additive by the US Food & Drug Administration.

The acidifying agent can be selected from the group consisting of: formic acid, acetic acid, benzoic acid, malonic acid, citric acid, maleic acid, fumaric acid, hypochlorous acid, succinic acid, gluconic acid, glutaric acid, lactic acid, 2-ethyl-1-hexanoic acid, octanoic acid, nonanoic acid, peracetic acid, peroctanoic acid, undecylenic acid, and mixtures thereof, or from the group consisting of: benzoic acid, citric acid, lactic acid succinic acid, maleic acid, succinic acid, octanoic acid, and mixtures thereof.

The composition may comprise from 0.01% to 40%, or from 0.03% to 25%, or from 0.5% to 15.0%, or from 1.0% to 8.0%, or from 2.0% to 6.0% by weight of the acidifying agent. An increased concentration of acidifying agent increases the composition's reserve buffering capacity, which reduces pH fluctuation upon dilution. Partial neutralization of the acidifying agent to a pH value just below its pKa (e.g., 0.1 to 0.5 pH units below the acidifying agent's pKa) may also help to reduce pH fluctuation upon dilution. A concentrate may therefore be formulated at an increased pH, which may lead to an improved overall safety profile without compromising in-use (diluted) antimicrobial performance.

A ready-to-use composition, such as compositions comprised within spray containers, may comprise from 0.01% to 1.0%, or from 0.1% to 0.8%, or from 0.2% to 0.6% by weight of the acidifying agent.

The weight ratio of surfactant to acidifying agent in the composition may be from about 50:1 to about 1:50, or from about 10:1 to about 1:10, or from about 5:1 to about 1:5, or from about 3:1 to about 1:3.

The acidifying agent may be chosen to potentiate or provide antimicrobial properties. Such acidifying agents may be selected from the group consisting of benzoic acid, citric acid, succinic acid, glycolic acid, lactic acid, octanoic acid, hypochlorous acid, peroxyacetic acid, peroxyoctanoic acid, and mixtures thereof. Acids characterized by reduced water solubility, including succinic acid, benzoic acid, cinnamic acid and octanoic acid, may be especially beneficial. A combination of succinic acid and octanoic acid is particularly beneficial for improving antimicrobial properties.

A suitable base to be used herein is an organic and/or inorganic base. Suitable bases for use herein are the caustic alkalis, such as sodium hydroxide, potassium hydroxide and/or lithium hydroxide, and/or the alkali metal oxides such, as sodium and/or potassium oxide and mixtures thereof. A preferred base is a caustic alkali, more preferably sodium hydroxide and/or potassium hydroxide.

Other suitable bases include ammonia, ammonium carbonate, $K_2CO_3$, $Na_2CO_3$ and alkanolamines (such as monoethanolamine, triethanolamine, aminomethylpropanol, and mixtures thereof).

Typical levels of such bases, when present, are from 0.01% to 5.0% by weight of the total composition, preferably from 0.03% to 3.0% and more preferably from 0.05% to 1.0%.

The present hard surface cleaning compositions have improved transparency, and thus reduced haziness. Preferably, the hard surface cleaning compositions have a % haze of from 0 to 15, more preferably 0 to 7, most preferably 0 to 5.

Detersive Surfactant:

The compositions of the present invention comprise a detersive surfactant. Suitable surfactants can be selected from the group consisting of an anionic surfactant, a cationic surfactant, a nonionic surfactant, an amphoteric surfactant, a zwitterionic surfactant, and mixtures thereof. Suitable surfactants may be branched or linear, saturated or unsaturated. The surfactant may comprise from 6 to 12 carbon atoms, or from 6 to 11 carbon atoms, or from about 6 to about 10 carbon atoms, or from 8 to 10 carbon atoms, in the primary carbon chain. The "primary carbon chain" denotes the longest carbon-based chain that is uninterrupted by a heteroatom, such as O, S, N and P. For example, n-octyl sulphate has 8 carbon atoms in the primary carbon chain, 2-propyl-1-heptyl sulphate has 7 carbon atoms in the primary carbon chain, and dodecyl methyl ester sulphonate ($C_{10}H_{21}$—CH($SO_3^-$)—C(O)O—$CH_3$) has 11 carbon atoms in the primary carbon chain. In the context of branched surfactants, $C_n$ (such as $C_1$ or $C_8$) refers to the number of carbon atoms in the primary carbon chain (for example, a 2-ethyl-1-hexyl primary carbon chain is $C_6$). In the context of linear (or unbranched) surfactants, $C_n$ (such as $C_1$ or $C_8$) refers to the total number of carbon atoms in the surfactant.

Without being bound by theory, it is believed that the short chain-length of the surfactant is particularly beneficial for antimicrobial applications involving shorter contact times between the microorganism and the composition, for example, from 10 seconds to 3 minutes or from 15 seconds to 2 minutes, or from 30 seconds to 1 minute. The short chain-length of the surfactant is believed to enhance the activity of antimicrobial active(s) in the composition. The short chain-length of the surfactant is also believed to improve the solubility of the amide in aqueous compositions. Critical Micelle Concentration (CMC) measurements in the presence and absence of the amide indicate that the surfactants disclosed herein enhance the solubility of the amide by incorporating the amide into the micellar structure (s) of the surfactant. The chain-length of the surfactant and the chain-length of the amide may be matched, for example, where the difference between the chain-length of the surfactant and the chain-length of the amide is 2 to 3 carbon atoms, to provide a combination of increased solubility of the amide in the composition and increased antimicrobial activity of the composition.

Suitable anionic surfactants can be selected from: alkyl sulphonates, ether sulphonates, alkyl sulphates, alkyl sulphates, alkyl ether sulphates, alkyl and/or alkenyl succinates, carboxylates (such as alkyl ethoxy carboxylates), and mixtures thereof. Suitable anionic surfactants include: sodium, potassium, ammonium, alkanol-ammonium magnesium and calcium salts of $C_8$-$C_{10}$ glyceryl ether sulphonates, $C_8$ alkyl sulphonates, $C_2$-$C_8$ linear alkyl benzene sulphonate, $C_6$-$C_{12}$ alkyl sulphates, $C_8$-$C_{12}$ alkyl ether sulphates, $C_{5-10}$ alkyl and alkenyl succinates as mono or dianionic surfactants [e.g., R—CH(COO$^-$ M$^+$)-CH$_2$—COO$^-$ M$^+$, R—CH(COO$^-$ M$^+$)—CH$_2$—COOH$^-$ and R—CH (COOH)—CH$_2$—COO$^-$ M$^+$ wherein R=$C_{5-10}$ linear or branched alkyl or alkenyl group and M=lithium, sodium, potassium, ammonium or alkanol-ammonium, and mixtures thereof], $C_8$-$C_{12}$ methyl ester sulphonates, $C_8$-$C_{12}$ fatty acid sulphonates and $C_6$-$C_{12}$ carboxylates, and mixtures thereof. The anionic surfactant can be selected from the group consisting of: sodium octyl sulphate, sodium decyl sulphate, sodium octyl glyceryl ether sulphonate ($C_8H_{17}$—O—CH$_2$—CH(OH)—CH$_2$SO$_3$Na), the sodium salt of 2-propyl-1-heptyl sulphate, the sodium salts of $C_{9-11}$ secondary sulphates, the sodium salts of $C_{12}$ methyl ester sulphonate and $C_{12}$ fatty acid sulphonate, and mixtures thereof, preferably from the group consisting of: octyl sulphate, sodium decyl sulphate, and mixtures thereof. The anionic surfactant may be derived from a renewable feedstock.

Suitable nonionic surfactants include linear or branched, saturated or unsaturated alcohol alkoxylates, alkyl glycosides, and mixtures thereof. The nonionic surfactant can be selected from the group consisting of: $C_{6-12}$ alcohol ethoxylate comprising an average of from 1 mole to 7 moles of ethylene oxide, $C_{6-12}$ alcohol ethoxy propoxylate comprising an average of from 1 mole to 7 moles of ethylene oxide and from 1 mole to 4 moles of propylene oxide, $C_8$ pyrrolidone, $C_8$ and $C_{8-10}$ alkyl polyglucoside with a degree of glucoside polymerization of from 1 to 1.6, $C_{8-10}$ alkyl polypentoside (e.g., xyloside and riboside) with a degree of sugar pentoside polymerization of from 1 to 1.6, and mixtures thereof, or selected from the group consisting of: octyl alkylpolyglycoside, decyl alkylpolyglycoside, octyl pyrrolidone, and mixtures thereof. The nonionic surfactant may be derived from a renewable feedstock.

Suitable cationic surfactants include saturated or unsaturated betaines, amine oxides, alkyl morpholinium compounds, alkyl trimethyl ammonium compounds, and mixtures thereof. The cationic surfactant can be selected from the group consisting of: n-octyl dimethyl amine oxide, n-octyl dimethyl betaine, n-octyl amidopropyl betaine, and mixtures thereof. At the pH of the composition, amine oxide surfactants are protonated and hence in their cationic form. The cationic surfactant may be derived from a renewable feedstock.

Suitable amine oxide surfactants include: $R_1R_2R_3NO$ wherein each of $R_1$, $R_2$ and $R_3$ is independently a saturated or unsaturated, substituted or unsubstituted, linear or branched hydrocarbon chain having from 1 to 30 carbon atoms. Preferred amine oxide surfactants are amine oxides having the following formula: $R_1R_2R_3NO$ wherein R1 is a hydrocarbon chain comprising from 1 to 30 carbon atoms, preferably from 6 to 20, more preferably from 8 to 16 and wherein $R_2$ and $R_3$ are independently saturated or unsaturated, substituted or unsubstituted, linear or branched hydrocarbon chains comprising from 1 to 4 carbon atoms, preferably from 1 to 3 carbon atoms, and more preferably are methyl groups. R1 may be a saturated or unsaturated, substituted or unsubstituted linear or branched hydrocarbon chain. The amine oxide surfactant can be present at a level of from 0.01% to 9.5%, preferably from 0.01% to 2.0%, more preferably from 0.05% to 1.0% by weight of the composition.

Highly preferred amine oxides are C8 dimethyl amine oxide, C10 dimethyl amine oxide, and C12-$C_{14}$ dimethyl amine oxide. C8 dimethyl amine oxide is commercially available under the trade name Genaminox® OC from Clariant, C10 dimethyl amine oxide is commercially available under the trade name Genaminox® K-10 from Clariant, $C_{12}$-$C_{14}$ dimethyl amine oxide is commercially available from Albright & Wilson, and under the trade name Genaminox® LA from Clariant or AROMOX® DMC from AKZO Nobel.

Suitable zwitterionic surfactants include 2-ethyl-1-hexyl imino dipropionate as well as n-dodecyl imino dipropionate (mono- and dianionic salts), $C_{6-12}$ amphoglycinates, and $C_{6-12}$ alkyl sulphobetaines, such as the sodium salt of n-octyl, n-decyl, or n-dodecyl N,N-dimethyl-3-ammonio-1-propanesulphonate.

The composition may comprise surfactant selected from the group consisting of $C_8$ glyceryl ether sulphonate, $C_6$-$C_{12}$ alkyl sulphate, $C_8$-$C_{12}$ methyl ester sulphonate, $C_8$-$C_{12}$ fatty acid sulphonate, $C_6$-$C_{12}$ ether carboxylate, C8-10 amine dimethyl oxide, $C_8$ pyrrolidone, $C_8$ dimethyl betaine, $C_{8-10}$ alkyl polyglucoside, $C_{8-12}$N,N-dimethyl-3-ammonio-1-propanesulphonate, and mixtures thereof.

The compositions may comprise from 0.01% to 20%, or from 0.03% to 10%, or from 0.10% to 1.5%, or 0.12% to 1.0% by weight of surfactant.

The compositions may comprise from 0.01% to 20%, or from 2.0% to 15%, or 3.0% to 10% by weight of surfactant. Such compositions are generally intended to be diluted prior to use.

A ready-to-use antimicrobial composition, for instance, for use with spray containers, may comprise from 0.01% to 3.0%, or from 0.10% to 1.5%, or from 0.12% to 1.0% by weight of surfactant.

The composition may further comprise one or more $C_{13-18}$ surfactants. When $C_{13-18}$ surfactant is present in the composition, the weight ratio of $C_{6-12}$ surfactant to $C_{13-18}$ surfactant may be greater than about 2:1, or greater than about 3:1. The average chain-length of the surfactant in the composition(s) may be less than $C_{12}$, or less than $C_{11}$. The surfactant in the composition may have an average chain-length of from $C_7$ to $C_8$, or from $C_8$ to $C_9$, or from $C_9$ to $C_{10}$, or from $C_{10}$ to $C_{11}$. The composition(s) may comprise surfactant having an average chain-length of about $C_8$. The solubility of the amide may be further increased by utilizing $C_{13-18}$ surfactants.

Commercial surfactants can be a blend of molecules having different alkyl chain lengths (though it is possible to obtain single chain-length cuts). For instance, Polystep® B-25 (from the Stepan Company) is described as sodium decyl sulphate but also contains about 25%-30% dodecyl sulphate, by weight of the alkyl sulphate surfactant. Similarly, many commercial lauryl surfactants may include up to 30% or more surfactant having chain-length(s) greater than $C_{12}$.

The critical micelle concentration (CMC) of the composition may be from 100 ppm to 2,500 ppm, or from 200 ppm to 2,000 ppm, or from 300 ppm to 1,500 ppm.

Antimicrobial Agent:

Suitable antimicrobial agents include antimicrobial agents selected from the group consisting of: quaternary ammonium compound, ionic silver, an active oxygen source, and mixtures thereof, preferably an active oxygen source.

In the cleaning compositions according to the invention, the antimicrobial agent should be be present in amounts which are effective in exhibiting satisfactory germicidal activity—against selected bacteria sought to be treated by the cleaning compositions. Such efficacy may be achieved against less resistant bacterial strains with only minor amounts of the antimicrobial agent being present, while more resistant strains of bacteria require greater amounts of the antimicrobial agent in order to destroy these more resistant strains.

A germicidally effective amount of the antimicrobial agent can be considered to result in at least a log 4.5, preferably at least a log 5 reduction of Staphylococcus aureus, using the method of EN1276 (Chemical Disinfectants Bactericidal Activity Testing), in less than 3 minutes.

Suitable quaternary ammonium compounds are cationic antimicrobial agents. Preferred quaternary ammonium compounds are those of the formula:

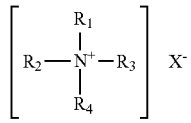

wherein at least one of $R_1$, $R_2$, $R_3$ and $R_4$ is a hydrophobic, aliphatic, aryl aliphatic or aliphatic aryl radical of from 6 to 26 carbon atoms, and the entire cation portion of the molecule has a molecular weight of at least 165. The hydrophobic radicals may be long-chain alkyl, long-chain alkoxy aryl, long-chain alkyl aryl, halogen-substituted long-chain alkyl aryl, long-chain alkyl phenoxy alkyl, aryl alkyl, etc. The remaining radicals on the nitrogen atoms other than the hydrophobic radicals are substituents of a hydrocarbon structure usually containing a total of no more than 12 carbon atoms. The radicals $R_1$, $R_2$, $R_3$ and $R_4$ may be straight chained or may be branched, but are preferably straight chained, and may include one or more amide or ester linkages. The radical X may be any salt-forming anionic radical, and preferably aids in the solubilization of the quaternary ammonium germicide in water. X can be a halide, for example a chloride, bromide or iodide, or X can be a methosulfate counterion, or X can be a carbonate ion.

More preferred quaternary ammonium compounds used in the compositions of the invention include those of the structural formula:

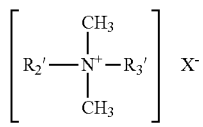

wherein $R_2'$ and $R_3'$ may be the same or different and are selected from C8-$C_{12}$ alkyl, preferably $R_2'$ and $R_3'$ are C10, or $R_2'$ is alkyl, preferably C12-C18 alkyl, C8-C18 alkylethoxy, C8-C18 alkylphenolethoxy and $R_3'$ is benzyl or substituted benzyl, preferably ethyl benzyl. X is a halide, for example a chloride, bromide or iodide, or X is a methosulfate counterion. The alkyl groups recited in $R_2'$ and $R_3'$ may be linear or branched, but are preferably substantially linear, or fully linear.

Exemplary quaternary ammonium compounds include the alkyl ammonium halides such as cetyl trimethyl ammonium bromide, alkyl aryl ammonium halides such as octadecyl dimethyl benzyl ammonium bromide, N-alkyl pyridinium halides such as N-cetyl pyridinium bromide, and the like. Other suitable types of quaternary ammonium compounds include those in which the molecule contains either amide or ester linkages such as octyl phenoxy ethoxy ethyl dimethyl benzyl ammonium chloride, N-(laurylcocoaminoformylmethyl)-pyridinium chloride, and the like. Other very effective types of quaternary ammonium compounds which are useful as germicides include those in which the hydrophobic radical is characterized by a substituted aromatic nucleus as in the case of lauryloxyphenyltrimethyl ammonium chloride, cetylaminophenyltrimethyl ammonium methosulfate, dodecylphenyltrimethyl ammonium methosulfate, dodecylbenzyltrimethyl ammonium chloride, chlorinated dodecylbenzyltrimethyl ammonium chloride, and the like.

Particularly useful quaternary germicides include compositions presently commercially available under the tradenames BARDAC, BARQUAT, BTC, and HYAMINE. These quaternary ammonium compounds are usually provided in a solvent, such as a C2 to C6 alcohol (such as ethanol, n-propanol, isopropanol, n-butanol, sec-butanol, and the like), glycols such as ethylene glycol, or in an mixtures containing water, such alcohols, and such glycols. Particularly preferred is didecyl dimethyl ammonium chloride, such as supplied by Lonza under tradenames such as: Bardac 2250™, Bardac 2270™, Bardac 2270E™, Bardac 2280™, and/or a blend of alkyl, preferably C12-C18, dimethyl benzyl ammonium chloride and alkyl, preferably C12-C18, dimethyl ethylbenzyl ammonium chloride, such as supplied by Lonza under the brand names: Barquat 4280Z™. In preferred embodiments, the alkyl dimethyl benzyl ammonium chloride and alkyl dimethyl ethylbenzyl ammonium chloride are present in a ratio of from 20:80 to 80:20, or 40:60 to 60:40, with a ratio of 50:50 being the most preferred.

Other suitable, but less preferred, antimicrobial agents include germicidal amines, particularly germicidal triamines such as LONZA-BAC 12, (ex. Lonza, Inc., Fairlawn, N.J. and/or from Stepan Co., Northfield Ill., as well as other sources).

In the cleaning compositions according to the invention, the antimicrobial agent, preferably quaternary ammonium compound, is required to be present in amounts which are effective in exhibiting satisfactory germicidal activity-against selected bacteria sought to be treated by the cleaning compositions. Such efficacy may be achieved against less resistant bacterial strains with only minor amounts of the quaternary ammonium compounds being present, while more resistant strains of bacteria require greater amounts of the quaternary ammonium compounds in order to destroy these more resistant strains.

The quaternary ammonium compound need only be present in germicidally effective amounts, which can be little as 0.001 wt %. In more preferred compositions, the hard surface cleaning composition comprises the antimicrobial agent at a level of from 0.05 wt % to 5.00 wt %, preferably from 0.1 wt % to 3.0 wt %, more preferably from 0.9% to 1.5 by weight of the composition, for improved shine in addition to germicidal efficacy.

Any suitable ionic silver can be used as the antimicrobial agent. As used herein, "ionic silver," refers to any silver (I) compound that may be solubilized or dispersed in an aqueous medium, preferably at a pH ranging from 1.0 to 6.0. Examples of ionic silver include silver acetate, silver lactate, silver nitrate, silver dihydrogen citrate, silver sulphate, silver citrate, as well as complexes of silver I formed with ammonia. The composition may comprise from 0.001%, or from 0.002%, or from 0.003%, or from 0.005% to 0.25%, or to 0.3%, or to 0.5%, or to 2% of ionic silver by weight of the composition. The concentration of ionic silver is calculated as the weight percent of silver present in an ionic silver compound. For example, the weight percent of ionic silver in a composition comprising 0.1% silver nitrate is 0.064% [0.1%*(107.9/169.9)] and the weight percent of silver in a composition comprising 0.1% silver dihydrogen citrate is 0.036% [0.1%*107.9/300.0].

Compositions comprising ionic silver may be substantially free of chloride ion, iodide ion, and/or bromide ion impurities; the compositions may comprise less than 10 ppm chloride ion, less than 10 ppm iodide ion, less than 10 ppm bromide ion, or less than 10 ppm of a mixture thereof, or less than 1 ppm chloride ion, less than 1 ppm iodide ion, less than 1 ppm bromide ion, or less than 1 ppm of a mixture thereof.

The composition(s) disclosed herein may comprise from 0.002% to 0.5% of antimicrobial active, where the antimicrobial active comprises ionic silver. The composition(s) disclosed herein may comprise from 0.002% to 0.5% of antimicrobial active, where the antimicrobial active comprises ionic silver selected from the group consisting of silver nitrate, silver dihydrogen citrate, silver acetate, silver sulphate, and mixtures thereof. The composition(s) disclosed herein may comprise amide of formula I and antimicrobial active, where the antimicrobial active comprises hydrogen peroxide, and in the amide of formula I, IV is selected from the group consisting of linear or branched, substituted or unsubstituted $C_6$-$C_{10}$ hydrocarbyl groups, wherein the weight ratio of hydrogen peroxide to the amide of formula I is from 0.2:1 to 5:1.

The composition may comprise an active oxygen source as a suitable antimicrobial agent. Suitable active oxygen sources include hydrogen peroxide, peroxyacids, organic peroxides and mixtures thereof. The active oxygen source can be present at a level of from 0.05% to 8%, or from 0.1% to 6%, or 0.2% to 5% by weight of the composition.

The peroxyacid can be preformed, or formed in-situ. For instance, the peroxyacids can be preformed in situ via the reaction of a carboxylic acid-containing acidifying agent and hydrogen peroxide. Suitable carboxylic acid-containing acidifying agent include: formic acid, acetic acid, benzoic acid, malonic acid, citric acid, maleic acid, fumaric acid, hypochlorous acid, succinic acid, gluconic acid, glutaric acid, lactic acid, 2-ethyl-1-hexanoic acid, cinnamic acid, heptanoic acid, octanoic acid, nonanoic acid, peracetic acid, peroctanoic acid, undecylenic acid, and mixtures thereof. For instance, octanoic acid or nonanoic acid can be used to form peroxyoctanoic acid or peroxynonanoic acid, respectively. The rate of formation of the peracid can depend on the pH of the composition (reduced pH favors peracid formation and faster rates of formation). The weight ratio of hydrogen peroxide to acidifying agent can be from 0.1:1 to 10:1, or from 0.2:1 to 5:1, or from 0.5:1 to 2:1.

The compositions may alternatively comprise hydrogen peroxide and be substantially free of $C_{6-12}$ peracids. Alternatively, the compositions may comprise catalytic amounts of peracid, for instance, from 1 ppm to 50 ppm, or 1 ppm to 10 ppm of the peracid.

The composition may comprise from 0.05% to 8%, or from 0.1% to 6%, or 0.2% to 5% by weight of the composition of hydrogen peroxide.

Compositions comprising hydrogen peroxide should comprise less than 5 ppm transition metal ion impurities, or less than 2 ppm transition metal ion impurities, or less than 0.5 ppm transition metal ion impurities. Compositions comprising hydrogen peroxide may comprise less than 5 ppm ferrous ion, less than 5 ppm ferric ion, or less than 5 ppm of a mixture thereof, or less than 1 ppm ferrous ion, less than 1 ppm ferric ion, or less than 1 ppm of a mixture thereof, or less than 0.1 ppm ferrous ion, less than 0.1 ppm ferric ion, or less than 0.1 ppm of a mixture thereof.

The combination of acid and hydrogen peroxide may generate measurable concentrations of peracid, from the reaction of acid and hydrogen peroxide.

The composition may be substantially free of trace transition metal impurities.

The Surface Modification Polymer:

The antimicrobial hard surface cleaning composition comprise a surface modification polymer. The polymer can improve grease cleaning, and/or improve the efficacy of the antimicrobial agent and other actives, especially the long term efficacy of such actives. The surface modification polymer is selected from the group consisting of: hydrophobically modified cationic polymer, oxazoline homopolymer, oxazoline, copolymer, vinylpyrrolidone homopolymer (PVP); polyethyleneglycol dimethylether (DM-PEG); a vinylpyrrolidone/dialkylaminoalkyl acrylate or methacrylate copolymers; a polystyrenesulphonate polymer (PSS); a poly vinyl pyridine-N-oxide (PVNO); a polyvinylpyrrolidone/vinylimidazole copolymer (PVP-VI); a polyvinylpyrrolidone/polyacrylic acid copolymer (PVP-AA); a polyvinylpyrrolidone/vinylacetate copolymer (PVP-VA); a polyacrylic polymer or polyacrylicmaleic copolymer; and a polyacrylic or polyacrylic maleic phosphono end group copolymer; and mixtures thereof.

Suitable hydrophobically modified cationic polymer are typically copolymers. The copolymer can comprise from 5 to 99.9 wt % of at least one non-ionic hydrophilic monomer; from 0.1 to 30 wt % of at least one non-ionic monomer having at least one pendant $C_{8-10}$ alkyl group (hydrophobic monomer); from 0 to 50, preferably 1 to 20 wt % cationic monomer comprising a primary, secondary, tertiary or quaternary ammonium group; and from 5 to 99 wt % of an ethylenically unsaturated anionic monomer. Preferably the copolymer comprises from 5 to 99 wt % non-ionic hydrophilic monomer and anionic monomer and mixtures thereof, based on the weight of the copolymer; and from 0.1 to 20 wt % of at least one hydrophobic monomer based on the weight of the copolymer; and from 0 to 50, preferably from 1 to 20 wt % cationic monomer which is capable of forming a cationic charge on protonation and comprises a primary, secondary or tertiary amino group or quaternary ammonium group. Preferred examples include hydroxyethylacrylate, hydroxyethylmethacrylate, hydroxypropyl acrylate, hydroxybutylacrylate, dimethylacrylamide, methacrylamide and acrylamide.

The copolymer preferably comprises non-ionic and/or anionic hydrophilic monomer in an amount from 80 to 99 wt %, or from 85 to 97 wt %.

Preferred cationic monomers are selected from those having a structural formula according to Monomer C, Monomer D, Monomer E and mixtures thereof.

Preferably the copolymer comprises from 30 to 99.9 wt %, more preferably from 70 or even 80 to 99 wt % or even 85 to 99 wt % non-ionic hydrophilic monomer, preferably Monomer A:

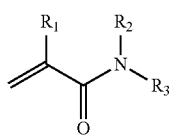

Monomer A wherein $R_1$ is H or $C_1$-$C_6$ alkyl; each of $R_2$ and $R_3$ is independently selected from H, $C_1$-$C_{18}$ alkyl.

The hydrophobic monomer is present in amounts from 0.1 to 50 wt %, preferably 0.5 wt % to 20 wt % or even 1 wt % to 10 wt % based on the weight of the copolymer. Preferred hydrophobic monomers are selected from those having the structural formula according to Monomer B.

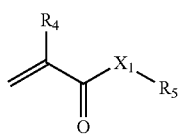

Monomer B wherein $R_4$ is H or $C_1$-$C_6$ alkyl; $X_1$ is O or NH; $R_5$ is $C_8$-$C_{30}$ n- or iso-alkyl.

Preferably the copolymer comprises from 1 wt % to 50 wt %, preferably 1 wt % to 20 wt % or even 1 wt % to 10 wt % Monomer B. $R_5$ is an alkyl group having from 8 to 22 carbon atoms, preferably an alkyl group having from 10 to 20 carbon atoms.

Optionally the copolymer comprises from 0 wt % to 30 wt %, or from 0 wt % to 15 wt %, or from 1 to 10 or 1 to 5 wt % of monomers according to the structural formula of Monomer C.

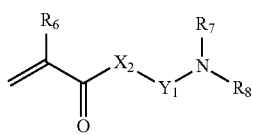

Monomer C wherein $R_6$ is H or $C_1$-$C_6$ alkyl; $R_7$, $R_8$ are each independently selected form H, $C_1$-$C_6$ alkyl; $X_2$ is O or NH, $Y_1$ is $(CH_2)_m$— where m is 1-30.

Optionally the copolymer comprises from 0 wt % to 30 wt %, or from 0 wt % to 15 wt %, or from 1 to 10 or 1 to 5 wt % of monomers according to the structural formula of Monomer D.

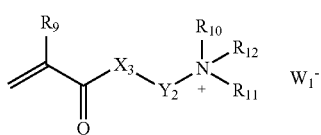

Monomer D wherein $R_9$ is H or $C_1$-$C_6$ alkyl; $R_{10}$, $R_{11}$, $R_{12}$ are each independently selected from $C_1$-$C_6$ alkyl, preferably $R_{10}$, $R_{11}$ and $R_{12}$ are each independently selected from methyl, ethyl and propyl; $X_3$ is O or NH; $Y_2$ is —$(CH_2)_m$— m is 1-30; $W_1$— is a counter ion.

Optionally the copolymer comprises from 0 wt % to 30 wt %, or from 0 wt % to 15 wt %, or from 1 to 10 or 1 to 5 wt % of monomers according to the structural formula of Monomer E.

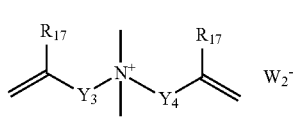

Monomer E wherein each $R_{17}$ is independently H or $C_1$-$C_6$ alkyl; $Y_3$, $Y_4$ are each independently selected from —$(CH_2)_m$— where n is 1-3; $W_2$— is a counter ion.

Optionally the copolymer comprises from 0 wt % to 99 wt %, or from 5 wt % to 99 wt %, or from 10 to 90 or 5 to 80 wt % of anionic monomers. Preferred anionic monomers are selected from acrylic acid (AA) or methacrylic acid (MAA), or a monomer according to the structural formula of Monomer F.

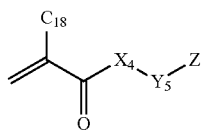

Monomer F wherein $R_{18}$ is H, $C_1$ to $C_6$ alkyl; $X_4$ is O or NH; $Y_5$ is linear or branched, saturated or unsaturated hydrocarbon group contain 1-15 carbon atoms; Z is a sulfate or sulfonate group.

Any anion may be used as the counter ion in Monomers D or E above. Preferred examples include $Cl^-$, $Br^-$, $I^-$, $HSO_4^-$, $CH_3SO_4^-$, $C_2H_5SO_4^-$, and $OH^-$.

Optionally the copolymer comprises monomers according to Monomer G. When present, Monomer G is typically present in amounts from 1 wt % to 20 wt %, preferably from 1 to 10 wt % based on the weight of the copolymer.

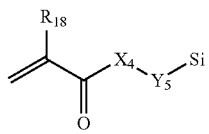

Monomer G wherein $R_{18}$ is H or $C_1$-$C_6$ alkyl; $X_4$ is O or NH; $Y_5$ is —$(CH_2)_m$— m is 0-30; Si is a silicone or a derivative thereof.

Preferably the sum of monomers A, B, C, D, E, F and G is 100 wt %. Preferably the copolymer has an overall charge which is neutral or positive. The copolymer may comprise a terpolymer of acrylic acid, diallyldimethyl ammonium chloride (DADMAC) and acrylamide or acrylamide derivative, where N, N-dimethylacrylamide is preferred. A particularly preferred copolymer comprises from 85 wt % to 99 wt % of Monomer A, from 1 wt % to 15 wt % of Monomer B, from 1 wt % to 10 wt % of Monomer C.

The copolymers can be obtained by any typical polymerization process for ethylenically unsaturated monomers. Preferably the copolymer has molecular weight less than 1,500,000 Daltons, preferably from 100,000 to 500,000 Daltons.

The copolymer can have the formula:

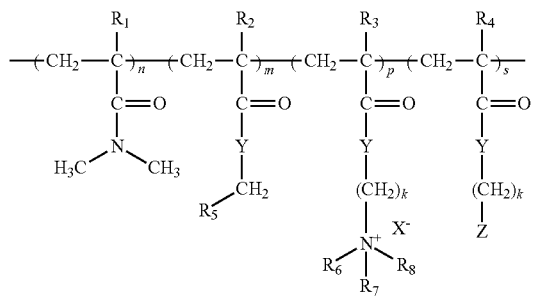

wherein:

n, m, p, and s are the mole percent of the respective monomers, such that:

n is from 80 to 99.5, preferably from 85 to 97, more preferably from 88 to 95;

m is from 0 to 10, preferably from 0.25 to 7, more preferably from 0.5 to 5;

p is from 0.25 to 20, preferably p is from 0.5 to 15, more preferably from 2 to 10;

s is from 0 to 10, preferably from 0.01 to 1, more preferably from 0.01 to 0.5;

m+s is at least 0.01;

with the proviso that the sum of the mole percentages add up to 100%;

$R_1$, $R_2$, $R_3$, and $R_4$ are independently H or $CH_3$;

$R_5$ is an alkyl group from C7 to C21, preferably $R_5$ is an alkyl group from C16 to C20, more preferably C17;

$R_6$, $R_7$, $R_8$, are independently selected from the group consisting of: hydrogen and $C_1$ to C4 alkyl;

$R_6$ is preferably H, and $R_7$, $R_8$, are preferably independently selected from the group consisting of: methyl, ethyl, and propyl;

Y is independently O or NH;

Z is silicone or a derivative thereof; Z can be a silicone or derivative selected from the group consisting of a polydimethylsiloxane, an aminosilicone, a cationic silicone, a silicone polyether, a cyclic silicone, a fluorinated silicone and mixtures thereof, preferably Z is polydimethylsiloxane;

Z can be a silicone or derivative having a molecular weight of from 250 to 40,000, preferably 500 to 20,000, more preferably 1,000 to 10,000 Da;

k is independently from 1 to 12, preferably from 2 to 8, more preferably from 2 to 5; and $X^-$ is an anion, preferably $Cl^-$, $Br^-$, $I^-$, $HSO_4{-}$, $CH_3SO_4{-}$, $C_2H_5SO_4{-}$, or $OH^-$.

In preferred embodiments, m is at least 0.01, and s is 0.

The hydrophobically modified cationic polymer has a molecular weight of less than 1,500,000 Daltons, preferably from 100,000 to 500,000 Daltons.

Oxazoline homopolymers and copolymers are particularly effective at improving the efficacy of antimicrobial agents, particularly residual antimicrobial efficacy.

Suitable oxazoline homopolymers can have the formula:

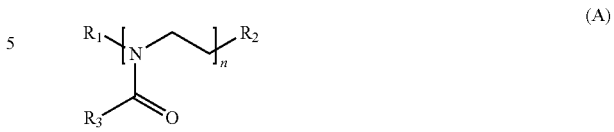

wherein in formula (A):

$R_1$ is a hydrogen, alkyl, alkenyl, alkoxy, alkylamino, alkynyl, allyl, amino, anilino, aryl, benzyl, carboxyl, arboxyalkyl, carboxyalkenyl, cyano, glycosyl, halo, hydroxyl, oxazolinium mesylate, oxazolinium tosylate, oxazolinium triflate, silyl oxazolinium, phenolic, polyalkoxy, quaternary ammonium, thiol, or thioether group;

$R_2$ is a hydrogen, alkyl, alkenyl, alkoxy, alkylamino, alkynyl, allyl, amino, anilino, aryl, benzyl, carboxyl, carboxyalkyl, carboxyalkyl, cyano, glycosyl, halo, hydroxyl, oxazolinium mesylate, oxazolinium tosylate, oxazolinium triflate, silyl oxazolinium, phenolic, polyalkoxy, quaternary ammonium, thiol, or thioether group, or a macrocyclic structure;

$R_3$ is a hydrogen, alkyl, alkenyl, alkoxy, aryl, benzyl, hydroxyalkyl, or perfluoroalkyl group; and n is in the range of from 1 to 1,000,000.

Suitable oxazoline homopolymers are described in US 2016/0262383 A1.

Suitable oxazoline copolymers can be derived from a monomer mixture comprising monomers having the formulas:

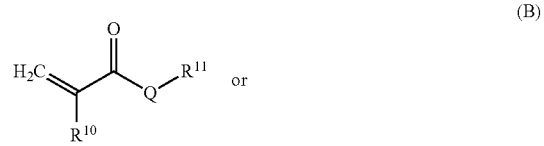

wherein:

Q is O or N;

$R^{10}$ is H or $CH_3$;

$R^{11}$ is an organic group comprising a hydrolysable silyl group;

$R^{12}$ is H or $CH_3$; and

P is

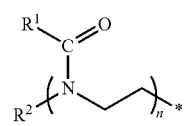

wherein in formula (C):

$R^1$ is selected from H, an alkyl group, an aryl group, and a combination thereof;

$R^2$ is selected from an alkyl group, an aryl group, a combination thereof, and a $R^f$—Y—$(CH_2)_x$ group;

$R^f$ is a perfluorinated alkyl group;

Y is selected from: —S(O)$_2$—N(CH$_3$)—, —S(O)$_2$—N(CH$_2$CH$_3$)—, —S(O)$_2$—O—, —S(O)$_2$—, —C(O)—, —C(O)—S—, —C(O)—O—, —C(O)—NH—, —C(O)—N(CH$_3$)—, —C(O)—N(CH$_2$CH$_3$)—, —(CH$_2$CH$_2$O)$_y$—, —O—, and —O—C(O)—CH=CH—C(O)—O—;

n is an integer of greater than 2;

x is an integer of at least 2;

y is an integer of at least 1.

Suitable oxazoline copolymers are described in US 2015/0307718 A1.

Suitable polymers for use herein are disclosed in EP patent application EP2272942 (09164872.5) and granted European patent EP2025743 (07113156.9). Suitable polymers include: vinylpyrrolidone homopolymer (PVP); polyethyleneglycol dimethylether (DM-PEG); a vinylpyrrolidone/dialkylaminoalkyl acrylate or methacrylate copolymers; a polystyrenesulphonate polymer (PSS); a poly vinyl pyridine-N-oxide (PVNO); a polyvinylpyrrolidone/vinylimidazole copolymer (PVP-VI); a polyvinylpyrrolidone/polyacrylic acid copolymer (PVP-AA); a polyvinylpyrrolidone/vinylacetate copolymer (PVP-VA); a polyacrylic polymer or polyacrylicmaleic copolymer; and a polyacrylic or polyacrylic maleic phosphono end group copolymer; and mixtures thereof.

The antimicrobial hard surface cleaning composition may comprise from 0.005% to 5.0% by weight of the total composition of the surface modification polymer, preferably from 0.10% to 4.0%, more preferably from 0.1% to 3.0% and most preferably from 0.20% to 2.0%, especially for ready-to-use compositions.

Amide:

The compositions disclosed herein may comprise an amide of formula I,

R$^1$—CO—NR$^2$R$^3$    (I)

where R$^1$ is selected from the group consisting of linear or branched, substituted or unsubstituted C$_6$-C$_{12}$, or C$_6$-C$_{10}$ hydrocarbyl groups, each of R$^2$ and R$^3$ is independently selected from H, OH, a halogen, or C$_1$-C$_6$ linear or branched, substituted or unsubstituted hydrocarbyl groups.

Such amides provide improved soil removal, especially grease cleaning, but can also potentiate the antimicrobial efficacy of antimicrobial agents, such as hydrogen peroxides, sources of hydrogen peroxide, and ionic silver.

It is believed that the amides disclosed herein potentiate the activity of antimicrobial actives against a variety of microorganisms, including Gram-positive bacteria, Gram-negative bacteria, non-enveloped viruses, fungi, mycobacteria, and even spore-forming organisms, such as *Clostridium difficile* spores, even though the amides alone typically do not exhibit antimicrobial efficacy.

The amide is present at a level of from 0.01% to 15.0%, preferably from 0.1% to 10.0%, more preferably from 0.1% to 2.0%, most preferably from 0.12% to 0.6% by weight of the composition. A concentrated antimicrobial composition may comprise from 3.0% to 15.0%, from 3.0% to 8.0%, from 3.0% to 6.0% by weight of an amide of formula I. A ready-to-use composition may comprise from 0.01% to 1.0%, or from 0.1% to 0.8%, or from 0.12% to 0.6%, weight of an amide of formula I.

The weight ratio of surfactant to amide of formula I may be from 0.05:1 to 10:1, or from 0.1:1 to 5:1, or from 0.2:1 to 5:1, or from 0.25:1 to 5:1.

Suitable amides of formula I include monounsaturated amides, saturated amides, and hydroxamic acids. Non-limiting examples of amides of formula I include n-octanamide, N-hexyl-N-methyl decanamide, N,N-diethanol octanamide, N,N-dimethyl decanamide, N,N-dimethyl 9-decenamide, N,N-dimethyl 7-octenamide, N,N-dibutyl hexanamide, octanohydroxamic acid, and N,N-diethanol dodecanamide, and mixtures thereof.

C$_{6-12}$ hydroxamic acids, such as octanohydroxamic, may also provide chelation. For example, octanohydroxamic acid is known to have transition metal chelation properties, especially with respect to iron cations. As such, octanohydroxamic acid may be used, as a chelator, in combination with another amide of formula I. Combinations of C$_{6-12}$ hydroxamic acid or C$_{6-10}$ hydroxamic acid and another amide of formula I may be beneficial in promoting enhanced antimicrobial activity.

Commercially available amides of formula I include Genagen 4296®, an N,N-dimethyl decanamide available from Clariant, Steposol® MET 10U, a N,N-dimethyl 9-decenamide available from Stepan Company, Cola®Mid AL, a lauric acid N,N-diethanol amide available from Colonial Chemical, and octanohydroxamic acid available from TCI America. Additionally, Steposol® M-8-10 is a mixture comprising approximately 55-60% N,N-dimethyl octanamide and approximately 40-45% N,N-dimethyl decanamide, which is derived from coconut oil and available from the Stepan Company.

Other Optional Ingredients:

Chelating agent: The antimicrobial hard surface cleaning composition can comprise a chelating agent or crystal growth inhibitor. Suitable chelating agents, in combination with the surfactant system, improve the shine benefit. Chelating agent can be incorporated into the compositions in amounts ranging from 0.05% to 5.0% by weight of the total composition, preferably from 0.1% to 3.0%, more preferably from 0.2% to 2.0% and most preferably from 0.2% to 0.4%.

Suitable phosphonate chelating agents include ethylene diamine tetra methylene phosphonates, and diethylene triamine penta methylene phosphonates (DTPMP), and can be present either in their acid form or as salts.

A preferred biodegradable chelating agent for use herein is ethylene diamine N,N'-disuccinic acid, or alkali metal, or alkaline earth, ammonium or substitutes ammonium salts thereof and mixtures thereof, for instance, as described in U.S. Pat. No. 4,704,233. A more preferred biodegradable chelating agent is L-glutamic acid N,N-diacetic acid (GLDA) commercially available under tradename Dissolvine 47S from Akzo Nobel.

Suitable amino carboxylates include ethylene diamine tetra acetates, diethylene triamine pentaacetates, diethylene triamine pentaacetate (DTPA), N-hydroxyethylethylenediamine triacetates, nitrilotriacetates, ethylenediamine tetrapropionates, triethylenetetraaminehexa-acetates, ethanoldiglycines, and methyl glycine diacetic acid (MGDA), both in their acid form, or in their alkali metal, ammonium, and substituted ammonium salt forms. Particularly suitable amino carboxylate to be used herein is propylene diamine tetracetic acid (PDTA) which is, for instance, commercially available from BASF under the trade name Trilon FS® and methyl glycine di-acetic acid (MGDA). Most preferred aminocarboxylate used herein is diethylene triamine pentaacetate (DTPA) from BASF. Further carboxylate chelating agents for use herein include salicylic acid, aspartic acid, glutamic acid, glycine, malonic acid and mixtures thereof.

Fatty acids are less preferred since they can affect the performance of many antimicrobial agents. If present, the fatty acid is preferably present at low levels of less than 0.5 wt % and can include the alkali salts of a C$_8$-C$_{24}$ fatty acid. Such alkali salts include the metal fully saturated salts like sodium, potassium and/or lithium salts as well as the ammonium and/or alkylammonium salts of fatty acids, preferably the sodium salt. Preferred fatty acids for use herein contain from 8 to 22, preferably from 8 to 20 and more preferably from 8 to 18 carbon atoms. Suitable fatty acids may be selected from caprylic acid, capric acid, lauric acid, myristic acid, palmitic acid, stearic acid, oleic acid, and mixtures of fatty acids suitably hardened, derived from natural sources such as plant or animal esters (e.g., palm oil, olive oil, coconut oil, soybean oil, castor oil, tallow, ground oil, whale and fish oils and/or babassu oil. For example coconut fatty acid is commercially available from KLK OLEA under the name PALMERAB1211.

Typically, the antimicrobial hard surface cleaning composition may comprise up to 6.0% by weight of the total composition of said fatty acid, preferably from 0.1% to 3.0%, more preferably from 0.1% to 2.0% and most preferably from 0.15% to 1.5% by weight of the total composition of said fatty acid.

Typically, the antimicrobial hard surface cleaning composition may comprise up to 2.0% by weight of the total composition of said branched fatty alcohol, preferably from 0.10% to 1.0%, more preferably from 0.1% to 0.8% and most preferably from 0.1% to 0.5%.

Solvent: The liquid compositions of the present invention may comprise solvent and mixtures thereof as a preferred optional ingredient.

Suitable further solvent can be selected from the group consisting of: aliphatic alcohols having from 1 to 6 carbon atoms, ethers and diethers having from 4 to 14 carbon atoms; glycol solvents, including glycol ether solvents including but not limited to such as ethylene glycol n-hexyl ether, propylene glycol n-butyl ether, and the like; alkoxylated aromatic alcohols; aromatic alcohols; alkoxylated aliphatic alcohols; aliphatic alcohols; $C_8$-$C_{14}$ alkyl and cycloalkyl hydrocarbons and halohydrocarbons; terpenes; and mixtures thereof. Ethers such as n-butoxypropanol ether are particularly preferred.

When present, the further solvent can be present at a level of from 0.1 wt % to 10 wt %, or 0.2 wt % to 5 wt %, or 0.5 wt % to 3 wt %.

Essential Oils:

Suitable essential oils or actives thereof include those essential oils which exhibit some antimicrobial properties. By "actives of essential oils" it is meant any ingredient of essential oils that exhibits some antimicrobial properties. Essential oils and actives thereof may also provide a desirable odor profile. Suitable essential oils include, but are not limited to, those obtained from thyme, lemongrass, citrus, lemons, oranges, anise, clove, aniseed, cinnamon, geranium, roses, mint, lavender, citronella, eucalyptus, peppermint, camphor, sandalwood, cedar, and mixtures thereof. Actives of essential oils include, but are not limited to, thymol (present, for example, in thyme), eugenol (present, for example, in cinnamon and clove), menthol (present, for example, in mint), geraniol (present, for example, in geranium and rose), verbenone (present, for example, in vervain), eucalyptol and pinocarvone (present in eucalyptus), cedrol (present, for example, in cedar), anethol (present, for example, in anise), carvacrol, hinokitiol, berberine, terpineol, limonene, and mixtures thereof. The compositions disclosed herein may comprise thymol. Thymol is commercially available, for example, from Sigma Aldrich.

Further Optional Ingredients:

The antimicrobial hard surface cleaning compositions may comprise a variety of other optional ingredients depending on the technical benefit aimed for and the surface treated. Suitable optional ingredients for use herein include perfume, builders, buffers, hydrotropes, colorants, stabilisers, radical scavengers, rheology modifiers, abrasives, soil suspenders, brighteners, anti-dusting agents, dispersants, dye transfer inhibitors, pigments, silicones and/or dyes.

Wipe or Pad

The present invention also relates to an article of manufacture comprising said composition, wherein the composition is comprised in a spray dispenser, or in a wipe or pad. The composition can be comprised on a wipe or pad. Such wipes and pads can be suitable for treating hard surfaces, such as found in the household, and the like. Suitable wipes can be fibrous. Suitable fibrous wipes can comprise polymeric fibres, cellulose fibres, and combinations thereof. Suitable cellulose-based wipes include kitchen wipes, and the like. Suitable polymeric fibres include polyethylene, polyester, and the like. Polymeric fibres can be spun-bonded to form the wipe. Methods for preparing thermally bonded fibrous materials are described in U.S. application Ser. No. 08/479,096 (Richards et al.), filed Jul. 3, 1995 (see especially pages 16-20) and U.S. Pat. No. 5,549,589 (Homey et al.), issued Aug. 27, 1996 (see especially Columns 9 to 10). Suitable pads include foams and the like, such as HIPE-derived hydrophilic, polymeric foam. Such foams and methods for their preparation are described in U.S. Pat. No. 5,550,167 (DesMarais), issued Aug. 27, 1996; and commonly assigned U.S. patent application Ser. No. 08/370,695 (Stone et al.), filed Jan. 10, 1995.

Method of Cleaning a Surface:

The antimicrobial hard surface cleaning compositions described herein are particularly suited for cleaning surfaces selected from the group consisting of: ceramic tiles, enamel, stainless steel, Inox®, Formica®, vinyl, no-wax vinyl, linoleum, melamine, glass, plastics and plastified wood, and combinations thereof. In particular, the compositions are particularly suited for reducing or removing antimicrobial activity from the surface, and for cleaning when the composition further comprises an amine oxide surfactant, other nonionic surfactant, and mixtures thereof.

For general cleaning, especially of floors and countertops, the preferred method of cleaning comprises the steps of:

a) optionally diluting the hard surface cleaning composition of the present invention;
b) applying the hard surface cleaning composition to a hard surface;
c) leaving the surface to dry, without wiping or rinsing the surface.

The antimicrobial hard surface cleaning composition may be diluted to a level of from 0.1% to 2.0%, or from 0.3% to 1.5% by volume. The antimicrobial hard surface cleaning composition may be diluted to a level of from 0.4% to 0.6% by volume, especially where the antimicrobial hard surface cleaning composition has a total surfactant level of greater than or equal to 5% by weight. Where the antimicrobial hard surface cleaning composition has a total surfactant level of less than 5% by weight, the antimicrobial hard surface cleaning composition may be diluted to a level of from 0.7% to 1.4% by volume. In preferred embodiments, the antimicrobial hard surface cleaning composition is diluted with water.

The dilution level is expressed as a percent defined as the fraction of the antimicrobial hard surface cleaning composition, by volume, with respect to the total amount of the diluted composition. For example, a dilution level of 5% by volume is equivalent to 50 ml of the antimicrobial hard surface cleaning composition being diluted to form 1000 ml of diluted composition.

The diluted composition can be applied by any suitable means, including using a mop, sponge, cloth, or other suitable implement.

Alternatively, the antimicrobial hard surface cleaning composition can be a "ready-to-use" composition, where dilution is not necessary. Such ready-to-use compositions can be comprised in a spray container.

In addition, for particularly dirty or greasy spots, or spots which have been contacted by microbes, the antimicrobial hard surface cleaning compositions, can be applied neat to the hard surface. When amine oxide and a further non-ionic surfactant is present, the composition provides improves penetration and removal of the stain, and especially of greasy stains, leading to improved surfactancy action and stain removal, as well as improved hygiene.

By "neat", it is to be understood that the liquid composition is applied directly onto the surface to be treated without undergoing any significant dilution, i.e., the liquid composition herein is applied onto the hard surface as described herein, either directly or via an implement such as a sponge, without first diluting the composition. By "without undergoing any significant dilution", what is meant is that the composition is diluted by less than 10 wt %, preferably less than 5 wt %, more preferably less than 3 wt %. Such dilutions can arise from the use of damp implements to apply the composition to the hard surface, such as sponges which have been "squeezed" dry.

In another preferred embodiment of the present invention said method of cleaning a hard surface includes the steps of applying, preferably spraying, said liquid composition onto said hard surface, leaving said liquid composition to act onto said surface for a period of time to allow said composition to act, with or without applying mechanical action.

Methods:

A) pH measurement:

The pH is measured on the neat composition, at 25° C., using a Sartarius PT-10P pH meter with gel-filled probe (such as the Toledo probe, part number 52 000 100), calibrated according to the instructions manual.

B) Shine:

Experiments to evaluate surface residues (i.e. shine performance) of the antimicrobial formulations were conducted using the following procedure. A clean, dry, glossy, black ceramic tile (20 cm×30 cm) was used as a representative hard surface. 0.5 mL of the ready-to-use antimicrobial formulation was applied diagonally across the tile surface from bottom left to top right to create a continuous liquid deposit on the tile. The liquid deposit was then wiped across the tile using a damp cotton cloth (8 cm×10 cm folded into quarters) using a pattern of ×8 wipes horizontally (back and forth), ×10 wipes vertically (up and down) and ×8 wipes horizontally (back and forth). This wiping regime was conducted in a single continuous motion without lifting the cloth from the tile. The tile was then allowed to dry for 20 minutes. Panelists were then asked to grade the severity of residues on the tile according to the following scale:

0=No streaks
1=Very slight streaks
2=Slight streaks
3=Slight to moderate streaks
4=Moderate streaks
5=Moderate to heavy streaks
6=Heavy streaks At least 8 panelists evaluated each tile. Mean streak gradings were compared using Dunnett's statistical test with nil solvent as the control, unless specified otherwise.

EXAMPLES

Examples of ready-to-use compositions of the present invention are shown in Table 1. The compositions can be made by mixing the components together, either as ready-to-use concentrations directly, or by first preparing a concentrated composition and then diluting in de-ionized water, such as a 1:10 dilution, to achieve the ready-to-use composition. The concentration of each component in a given composition corresponds to the weight of the component, provided on an active basis, as a percent of the total weight composition. The hydrogen peroxide is preferably added last to avoid any unintentional chemical reaction.

TABLE 1

Example ready-to-use composition (active weight %)

| | Ex. 1 | Ex. 2 | Ex. 3 | Ex. 4 | Ex. 5 | Ex. 6 | Ex. 7 |
|---|---|---|---|---|---|---|---|
| Sodium octyl sulphate | 0.15 | 0.15 | 0.15 | 0.6 | 0.6 | 0.15 | 0.15 |
| N,N-dimethyl octanamide N,N-dimethyl decanamide (55:45) | 0.20 | 0.20 | 0.20 | 0.6 | 0.6 | 0.20 | 0.20 |
| Succinic acid | 0.20 | 0.20 | 0.20 | 0.5 | 0.5 | 0.20 | 0.20 |
| Octanoic acid | 0.16 | 0.16 | 0.16 | — | — | 0.16 | 0.16 |
| Sodium hydroxide | 0.1 | 0.1 | 0.1 | — | 0.1 | 0.1 | 0.1 |
| Hydrogen peroxide | 0.5 | 0.5 | 0.5 | 0.45 | — | — | — |
| 50:50 Blend of alkyl dimethyl benzyl ammonium chloride and alkyl dimethyl ethylbenzyl ammonium chloride[1] | — | — | — | — | 0.07 | 0.1 | 0.2 |
| Decyl dimethyl amine oxide | — | — | — | — | — | 0.5 | — |
| hydrophobically modified cationic polymer[2] | 0.05 | — | — | 0.1 | — | — | — |
| hydrophobically modified cationic polymer[3] | — | 0.1 | — | — | 0.2 | — | 0.15 |
| vinylpyrrolidone copolymer[4] | — | — | 0.15 | — | — | 0.07 | — |
| Poly (2-ethyl-2-oxazoline) | — | — | 0.5 | — | — | — | — |
| Propylene glycol | 0.5 | — | 0.5 | — | — | 0.5 | 2.0 |

TABLE 1-continued

| Example ready-to-use composition (active weight %) | | | | | | | |
|---|---|---|---|---|---|---|---|
| | Ex. 1 | Ex. 2 | Ex. 3 | Ex. 4 | Ex. 5 | Ex. 6 | Ex. 7 |
| Propylene Glycol n-Butyl Ether | — | 0.5 | — | 2.0 | 2.0 | — | — |
| Deionized water | to 100 | to 100 | to 100 | to 100 | to 100 | to 100 | to 100 |

[1]Barquat 4280Z ™, supplied by Lonza
[2]Copolymer of N,N, dimethyl acryl amide, n-octadecyl acrylamide, and C8 is N-2-ethylhexyl acrylamide in a molar ratio of 98.43:0.31:1.26, having a weight average molecular weight of from 100,000 to 500,000 Daltons
[3]Copolymer of N,N, dimethyl acryl amide, n-octadecyl acrylamide, C8 is N-2-ethylhexyl acrylamide, and polydimethylsiloxane of molecular weight 1,000 Da, in a molar ratio of 44:1.0:2.5:2.5, having a weight average molecular weight of from 100,000 to 500,000 Daltons
[4]vinylpyrrolidone/dimethylaminoethylmethacrylate (VP/DMAEMA) copolymer, sourced as Sorez ™ HS-205 from Ashland Inc.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. An antimicrobial hard surface cleaning composition comprising:
   a. from about 0.03% to about 10%, by weight of the composition, of a detersive surfactant;
   b. from about 0.05% to about 8%, by weight of the composition, of an antimicrobial agent;
   c. from about 0.1% to about 2.0%, by weight of the composition, of an amide of formula I:

$$R^1-CO-NR^2R^3 \quad (I)$$

wherein $R^1$ is selected from the group consisting of linear or branched, substituted or unsubstituted $C_6$-$C_{12}$, each of $R^2$ and $R^3$ is independently selected from H, OH, a halogen, or $C_1$-$C_6$ linear or branched, substituted or unsubstituted hydrocarbyl groups;

d. from about 0.2% to about 2.0%, by weight of the total composition, of a surface modification polymer, wherein the surface modification polymer is selected from the group consisting of: hydrophobically modified cationic polymer; oxazoline homopolymer; oxazoline copolymer; vinylpyrrolidone homopolymer (PVP); polyethyleneglycol dimethylether (DM-PEG); a vinylpyrrolidone/dialkylaminoalkyl acrylate or methacrylate copolymers; a polystyrenesulphonate polymer (PSS); a poly vinyl pyridine-N-oxide (PVNO); a polyvinylpyrrolidone/vinylimidazole copolymer (PVP-VI); a polyvinylpyrrolidone/polyacrylic acid copolymer (PVP-AA); a polyvinylpyrrolidone/vinylacetate copolymer (PVP-VA); a polyacrylic polymer or polyacrylicmaleic copolymer; and a polyacrylic or polyacrylic maleic phosphono end group copolymer; and mixtures thereof;

e. water; and said composition has a pH from about 1.0 to about 6.0, wherein the antimicrobial agent is hydrogen peroxide.

2. The composition according to claim 1, wherein the surface modification polymer is a hydrophobically modified cationic polymer comprising:
   (a) from about 5 to about 99.9 wt % of at least one non-ionic hydrophilic monomer;
   (b) from about 0.1 to about 30 wt % of at least one non-ionic monomer having at least one pendant $C_{8-30}$ alkyl group;
   (c) from about 0 to about 50 wt %, cationic monomer comprising a primary, secondary, tertiary or quaternary ammonium group; and
   (d) from about 0 to about 99 wt % of an ethylenically unsaturated anionic monomer.

3. The composition according to claim 2, wherein the surface modification polymer has the formula:

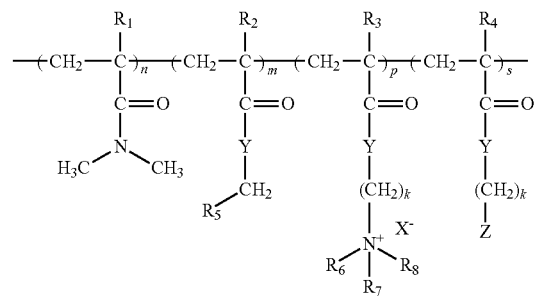

wherein:

n, m, p, and s are the mole percent of the respective monomers, such that:
   n is from about 80 to about 99.5;
   m is from about 0 to about 10;
   p is from about 0.25 to about 20;
   s is from about 0 to about 10;
   m+s is at least about 0.01;
   with the proviso that the sum of the mole percentages add up to 100%;
$R_1$, $R_2$, $R_3$, and $R_4$ are independently H or $CH_3$;
$R_5$ is an alkyl group from C7 to C21;

$R_6$, $R_7$, $R_8$, are independently selected from the group consisting of:
hydrogen and C1 to C4 alkyl;
Y is independently O or NH;
Z is silicone or a derivative thereof;
k is independently from 1 to 18;
$X^-$ is an anion.

4. The composition according to claim 1, wherein the amide of formula I is selected from the group consisting of N,N-dimethyl octanamide, N,N-dimethyl decanamide, N,N-dimethyl 9-decenamide, N,N-dimethyl 7-octenamide, octanohydroxamic acid, and mixtures thereof.

5. The composition according to claim 1, wherein the detersive surfactant comprises from 6 to 12 carbon atoms in the primary carbon chain.

6. The composition according to claim 1, wherein the composition further comprises amine oxide surfactant at a level of from about 0.01% to about 9.5% by weight of the composition.

7. The composition according to claim 6, wherein the composition further comprises amine oxide surfactant at a level of from about 0.01% to about 2.0% by weight of the composition.

8. The composition according to claim 1, wherein the composition further comprises an acidifying agent selected from the group consisting of: organic acid, inorganic acid, and mixtures thereof.

9. A method for cleaning a hard surface, comprising the steps of:
   a. optionally diluting the hard surface cleaning composition according to claim 1;
   b. applying the hard surface cleaning composition according to claim 1 or the diluted hard surface cleaning composition obtained from step a. to a hard surface;
   c. leaving the hard surface to dry without rinsing the surface.

\* \* \* \* \*